(No Model.) 5 Sheets—Sheet 1.
W. B. DODDRIDGE.
TURN TABLE.
No. 561,974. Patented June 16, 1896.
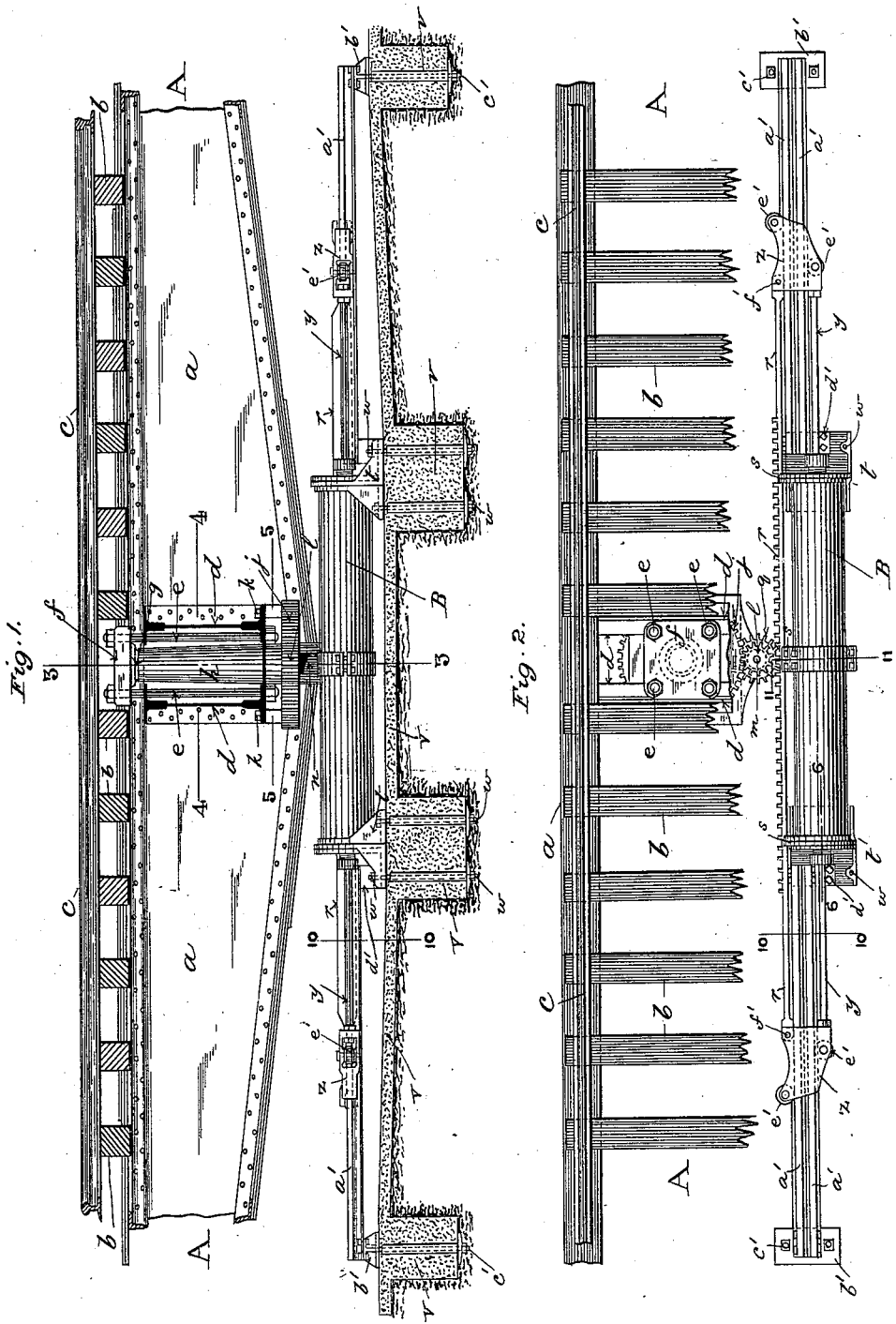
Witnesses
Geo Bray
Louis J Maynard
Inventor
William B. Doddridge
By Edward W Purrell
His Atty

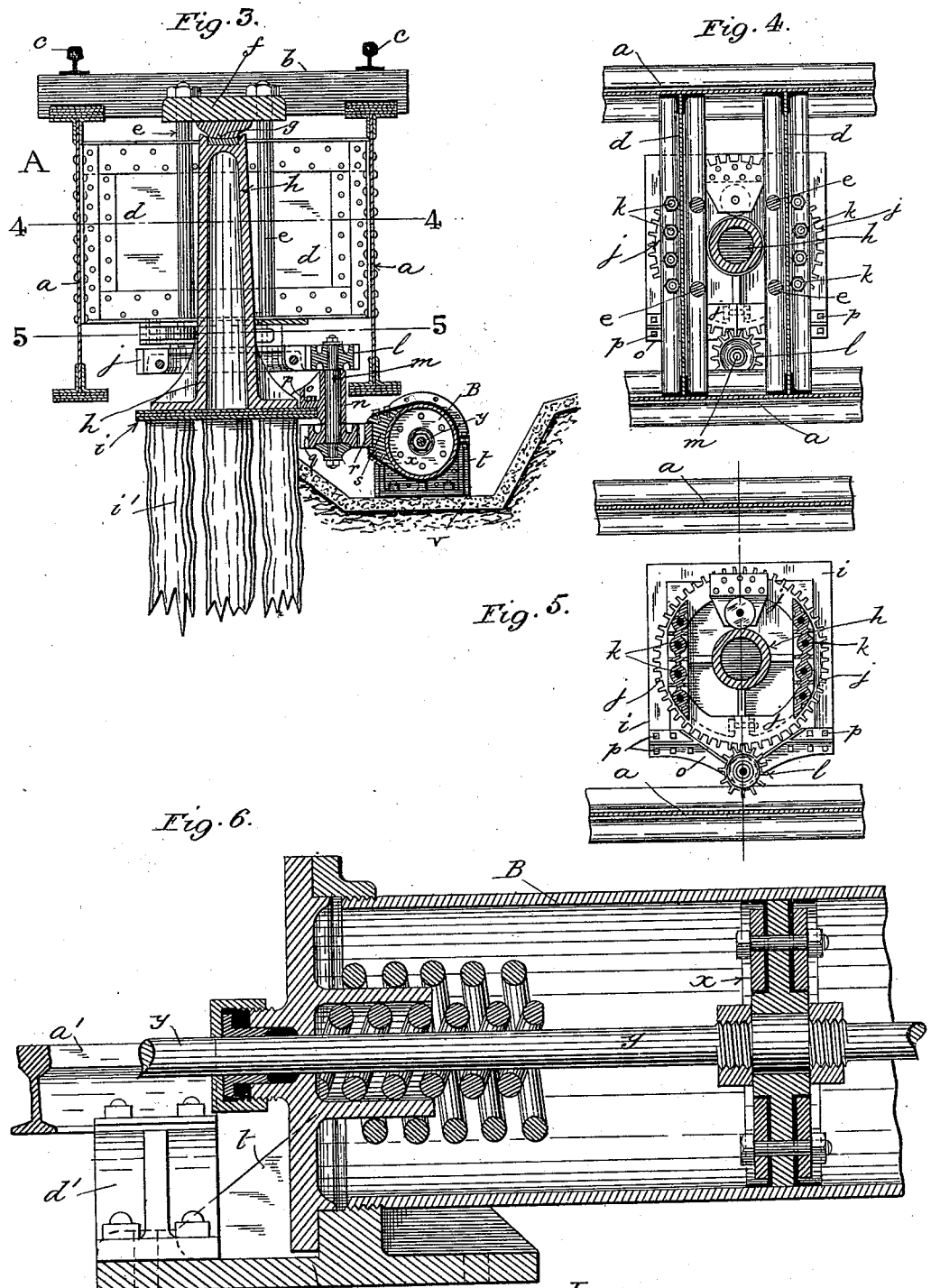

(No Model.) 5 Sheets—Sheet 3.

W. B. DODDRIDGE.
TURN TABLE.

No. 561,974. Patented June 16, 1896.

WITNESSES
Geo Bray
Louis J Hayward

INVENTOR
William B. Doddridge
By Edward W. Furrell
His Atty

ANDREW B.GRAHAM. PHOTO-LITHO. WASHINGTON,D.C.

(No Model.) 5 Sheets—Sheet 4.
W. B. DODDRIDGE.
TURN TABLE.
No. 561,974. Patented June 16, 1896.
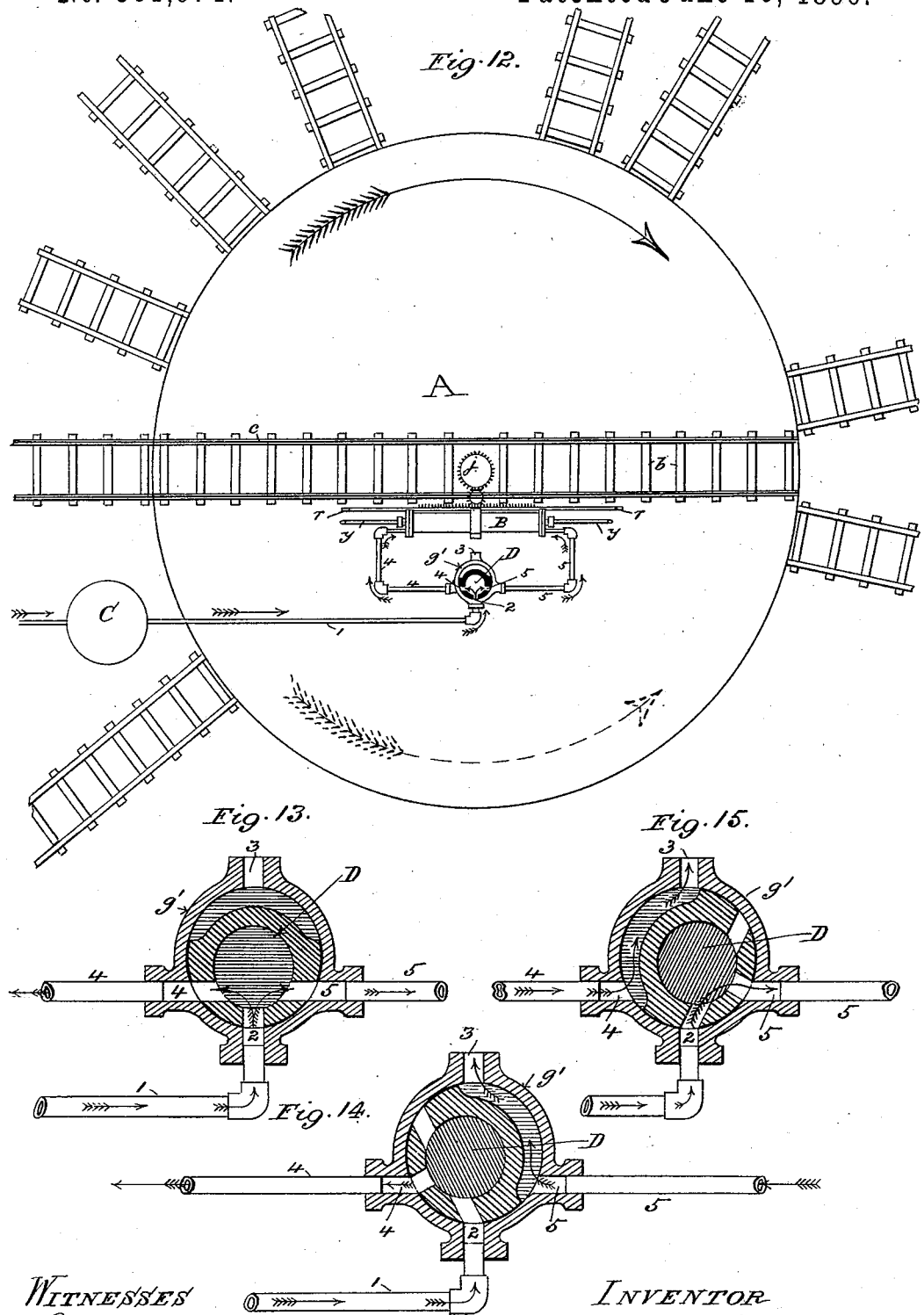
Witnesses
Geo Bray
Louis J Hayward
Inventor
William B. Doddridge
By Edward W Purrell
His Atty (No Model.)  5 Sheets—Sheet 5.
W. B. DODDRIDGE.
TURN TABLE.
No. 561,974.  Patented June 16, 1896.
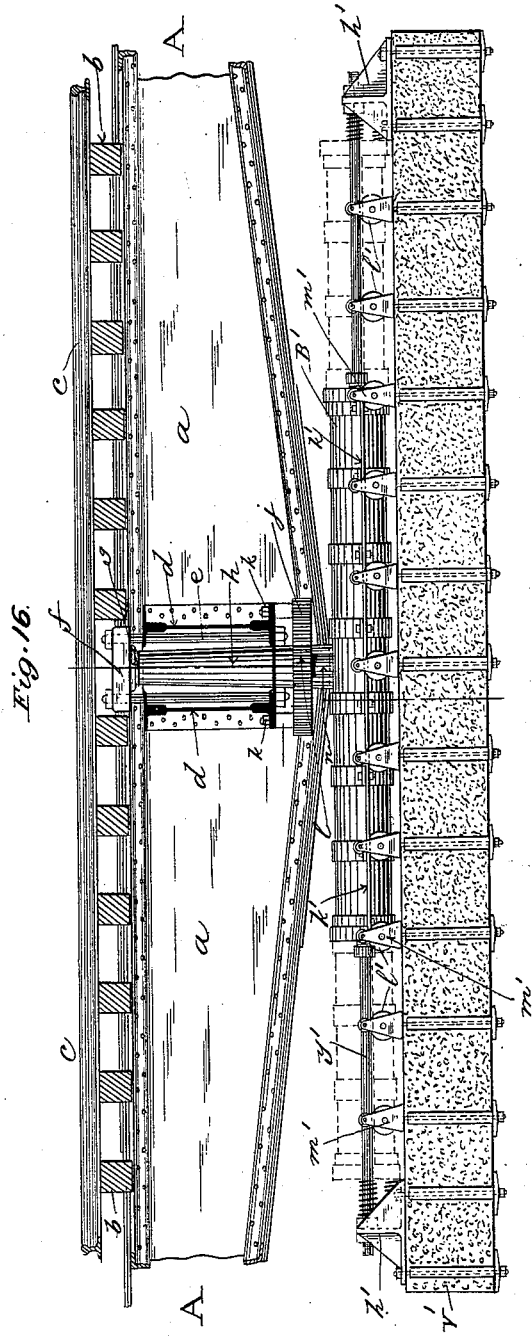
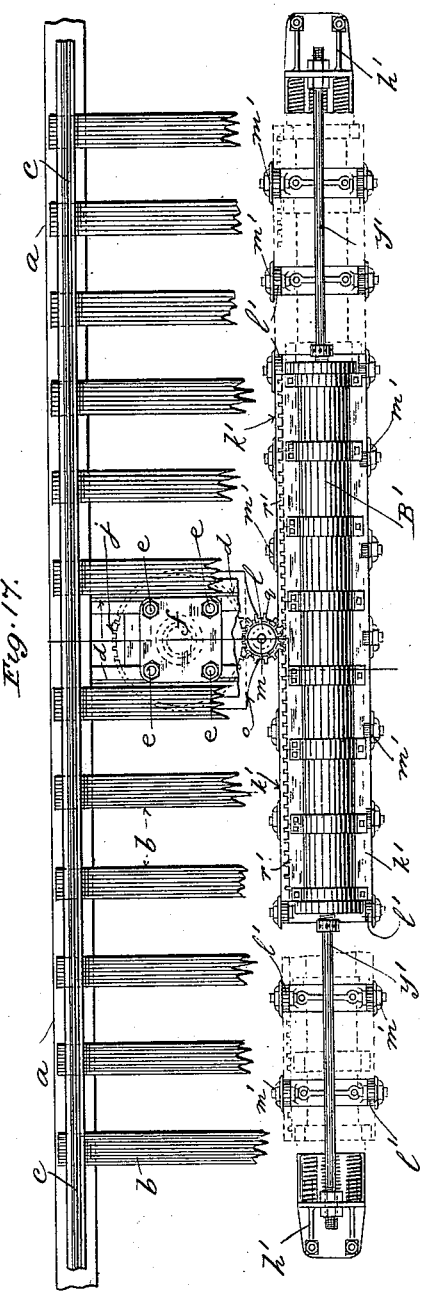
WITNESSES
Geo Bray
Louis J Hayward
INVENTOR
William B. Doddridge
By Edward W. Furrell
His Atty

UNITED STATES PATENT OFFICE.

WILLIAM B. DODDRIDGE, OF ST. LOUIS, MISSOURI.

TURN-TABLE.

SPECIFICATION forming part of Letters Patent No. 561,974, dated June 16, 1896.

Application filed February 27, 1896. Serial No. 580,978. (No model.)

*To all whom it may concern:*

Be it known that I, WILLIAM B. DODDRIDGE, a citizen of the United States, residing at St. Louis, in the State of Missouri, have invented a new and useful Improvement in Turn-Tables, of which the following is a specification.

This invention relates to improved means for operating a railroad or other turn-table for turning locomotive-engines, railroad-cars, ordnance, or other heavy objects. Ordinarily a turn-table, such as used on railroads, is mounted horizontally on a central pivot, and provided at the circumference with a projecting bar or lever, by which the turn-table is rotated manually.

My invention has for its object to operate a turn-table automatically and thereby economize labor.

My invention consists in features of novelty hereinafter described and claimed, reference being had to the accompanying drawings, forming part of this specification, whereon—

Figure 7:
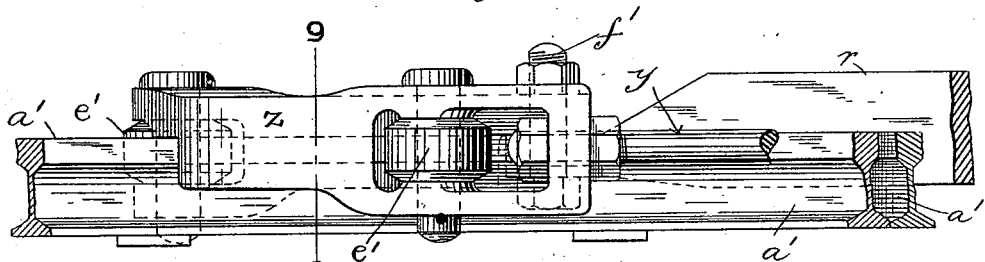
Figure 8:
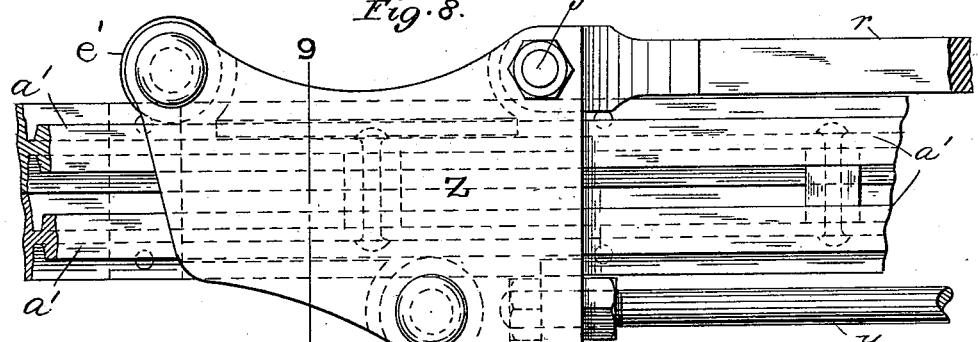
Figure 9:
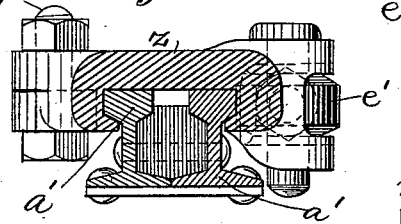
Figure 10:
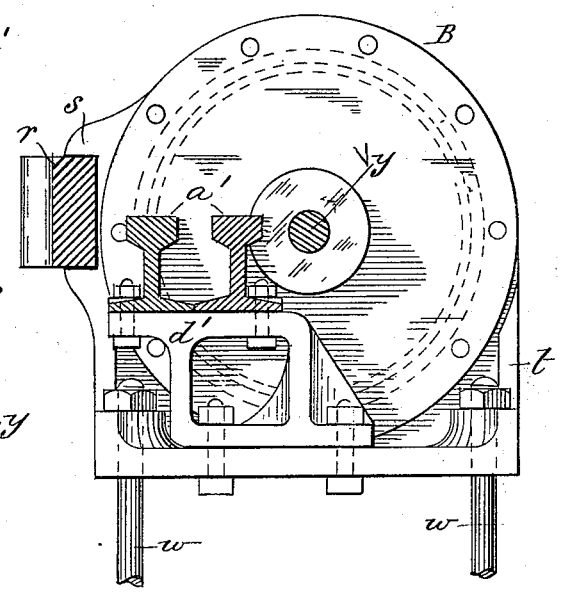
Figure 11:
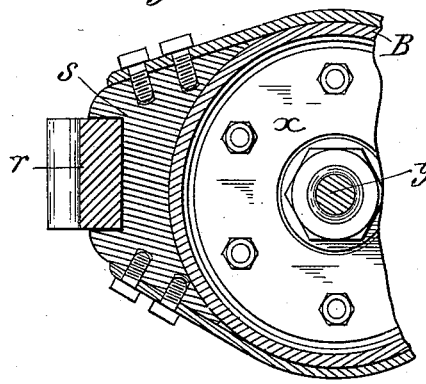

Figure 1 is a side elevation of the middle and adjacent parts of a railroad turn-table constructed according to my invention, omitting one of the main side girders; Fig. 2, a plan thereof; Fig. 3, a transverse section, to enlarged scale, through the turn-table on line 3 3 in Fig. 1; Figs. 4 and 5, horizontal sections on lines 4 4 and 5 5, respectively, in Figs. 1 and 3. Fig. 6 is a vertical longitudinal section, to enlarged scale, through one end and adjacent part of the cylinder, with its contained piston, forming parts of my invention and taken on line 6 6 in Fig. 2; Figs. 7 and 8, detail views, to enlarged scale, of the piston-rod, cross-head, and guide, seen to the right and left, respectively, of the cylinder in Figs. 1 and 2; Fig. 9, a cross-section thereof on line 9 9 in Figs. 7 and 8; Fig. 10, a cross-section, to enlarged scale, through the piston-rod and cross-head guide on line 10 10 in Figs. 1 and 2, showing the cylinder-head and supports in end elevation; Fig. 11, a cross-section, to enlarged scale, through the cylinder (broken away) on line 11 11 in Fig. 2, showing the toothed bar and its guide, forming part of my invention. Fig. 12 is a diagrammatic plan of the turn-table to reduced scale, showing the valve and its connections with the cylinder and compressed-air reservoir preferably used in operating the turn-table. Figs. 13, 14, and 15 are detached views, to enlarged scale, of the valve seen in Fig. 12 in various positions; and Figs. 16 and 17, corresponding views to Figs. 1 and 2, showing an alternative arrangement of the parts comprising my invention.

Like letters and numerals of reference denote like parts in all the figures.

A represents a railroad turn-table composed of two parallel side girders $a$, on which are secured the cross-ties $b$, carrying the rails $c$ in the usual manner. The side girders $a$ are connected together by cross-girders $d$, which are arranged parallel to each other at an equal distance, respectively, from the middle of the girders $a$, and are suspended by bolts $e$ from an upper intermediate horizontal plate $f$, which is pivoted at the center line of gravity of the turn-table A in a concave bearing $g$ at the top of a fixed upright post $h$, mounted on the base-plates $i$, which are supported by the piles $i'$ or other suitable foundation, the turn-table A being free to rotate on its pivot $g$ in either direction around the post $h$ in the usual manner.

Surrounding but unattached to the post $h$, at a suitable height from its base $i$, is a toothed (preferably spur) wheel $j$, which is fixed horizontally and axially with the pivot $g$ by bolts $k$ (see particularly Figs. 4 and 5) to the under side of the cross-girders $d$ or turn-table A. In gear with the spur-wheel $j$ is a spur-pinion $l$, fixed on an upright shaft $m$, which is mounted in an upright bearing $n$, carried by a bracket $o$, which is fixed to the base-plates $i$ of the post $h$ by bolts $p$, Figs. 1, 4, and 5. On the shaft $m$, below its bearing $n$, is fixed a horizontal toothed spur-wheel $q$, which is engaged by a toothed bar $r$. The toothed bar $r$ is adapted to slide longitudinally in guides $s$, carried by or formed on the side of a horizontally-arranged cylinder B, which is closed at both ends and secured thereat to brackets or supports $t$, fixed to the foundation $v$ by bolts $w$, as shown, or in any other suitable manner. In the cylinder B is a piston $x$, Figs. 6 and 11, having a rod $y$, which extends from each side of the piston $x$ through the end of the cylinder B, the outer ends of the piston-rod $y$ being fixed, respectively, to a cross-head $z$, having a horizontal guide $a'$, which in the present case is preferably composed of double parallel rails fixed at their outer ends to a bracket or support $b'$, which is secured to the foundation $v$ by bolts $c'$, the other ends of the guide-rails $a'$ being fixed to a bracket $d'$, carried by the support $t$ of the cylinder B. Each cross-head $z$ is provided with rollers $e'$, which bear circumferentially against the outsides of the heads of the guide-rails $a'$ for reducing friction, all constructed and arranged as shown particularly in Figs. 7, 8, and 9.

Each end of the toothed bar $r$, which is parallel to the piston-rod $y$, is fixed to the corresponding cross-head $z$ by a bolt $f'$ or in any other suitable manner, the whole operating so that on the movement of the piston $x$ in either direction within the cylinder B a corresponding movement is imparted longitudinally to the toothed bar $r$, which causes the spur-wheel $q$ and pinion $l$ to rotate the spur-wheel $j$, and with it the turn-table A, on its pivot $g$ in the opposite direction to the rotation of the wheel $q$ and pinion $l$, as will be clearly understood. The ends of the turn-table A are provided with balance check-rollers (not shown) having a circular track on the foundation in the usual well-known manner.

I preferably move the piston $x$ by compressed air, (see Figs. 12, 13, 14, and 15,) which is supplied from any suitable air-compressor to the reservoir C, whence it is directed through a pipe 1 to either side of the piston $x$ within the cylinder B at will by means of a preferably four-way equalizing-valve D, which is fitted and adapted to be rotated within a cylindrical box or casing $g'$, having an inlet-opening 2, communicating with the pipe 1, and an exhaust-opening 3, communicating with the external atmosphere, and having two opposite discharge-openings 4 and 5, communicating with each end of the cylinder B, respectively, the openings 2 3 4 5 being of equal size and corresponding to similar openings through the valve D.

In the position of the valve D as seen in Figs. 12 and 13 the air supply from the reservoir C passes through the pipe 1 and through the valve-openings 2, 4, and 5 into the cylinder B on each side of the piston $x$, which is thereby held in equilibrium or at rest.

On moving the valve D by its handle (not shown) into the position seen in Fig. 14 the air supply passes through the pipe 1 and valve-openings 2 and 4 into the cylinder B on the side of the piston $x$ corresponding to the opening 4, the compressed air in the cylinder B on the other side of the piston $x$ passing therefrom through the valve-openings 5 and 3 into the atmosphere, whereby the piston $x$, and with it the toothed bar $r$, is moved so as to rotate the spur-wheel $j$ and turn-table A in the direction of the arrow indicated by full lines in Fig. 12.

On moving the valve D into the position seen in Fig. 15 the air supply passes through the pipe 1 and valve-openings 2 and 5 into the cylinder B on the side of the piston $x$ corresponding to the opening 5 and exhausts from the cylinder B on the other side of the piston $x$ through the openings 4 and 3 into the atmosphere, whereby the piston $x$ is moved so as to rotate the spur-wheel $j$ and turn-table A in the direction of the arrow indicated by broken lines in Fig. 12.

By means of the valve D the opening and closing of the inlet and exhaust passages, respectively, to and from the cylinder B on the opposite sides of the piston $x$ are effected simultaneously and to equal extent, whereby the piston $x$ is moved and the turn-table A operated without jar or tendency to race, as, owing to the positive equalization between the admission and exhaust, the momentum which would otherwise be acquired by the piston $x$ in overcoming the inertia of the turn-table at starting is restrained and steadiness of movement insured.

I do not limit myself to the use of compressed air for moving the piston $x$, nor to the particular construction of the valve above described for controlling the air, as the same or similar results may be obtained by the use of steam, gas, hydraulic, electric, or other motive power.

In the modification of the invention seen in Figs. 16 and 17 the piston is stationary and the cylinder B' moved in either direction by the compressed air along the piston-rod $y'$, the ends whereof are fixed to brackets or supports $h'$, secured to the foundation $v'$. The cylinder B', which carries with it the toothed bar $r'$, is provided with horizontal side flanges or bearing-bars $k'$, which are supported and held in alinement throughout the stroke of the cylinder B (indicated by broken lines) by flanged rollers $l'$, which are mounted in bearings $m'$, secured to the foundation $v'$. The toothed bar $r'$ engages with the spur-wheel $q$ and operates the turn-table A in the same manner as in the arrangement before described.

What I claim as my invention, and desire to secure by Letters Patent, is—

In a turn-table mounted centrally on a pivot, a toothed wheel fixed to the turn-table axially with the pivot, a pinion engaging the said wheel and fixed on a shaft having a bearing, a spur-wheel fixed on the shaft and engaged by a toothed bar supported in guides, a cylinder containing a piston, a rod fixed to the piston and connected to the toothed bar, a guide for the said rod, and means for moving the piston within the cylinder, substantially as described.

WILLIAM B. DODDRIDGE.

Witnesses:
 F. W. IRLAND,
 EDWARD W. FURRELL.